United States Patent
Watanabe et al.

(10) Patent No.: US 7,268,917 B2
(45) Date of Patent: Sep. 11, 2007

(54) IMAGE CORRECTION PROCESSING METHOD AND APPARATUS FOR CORRECTING IMAGE DATA OBTAINED FROM ORIGINAL IMAGE AFFECTED BY PERIPHERAL LIGHT-OFF

(75) Inventors: Kazumi Watanabe, Wakayama (JP); Koji Kita, Wakayama (JP)

(73) Assignee: Noritsu Koki Co., Ltd., Wakayama-Ken (JP)

(*) Notice: Subject to any disclaimer, the term of this patent is extended or adjusted under 35 U.S.C. 154(b) by 990 days.

(21) Appl. No.: 10/603,458

(22) Filed: Jun. 24, 2003

(65) Prior Publication Data

US 2004/0095611 A1 May 20, 2004

(30) Foreign Application Priority Data

Jul. 5, 2002 (JP) .............................. 2002-196988

(51) Int. Cl.
*G06K 15/00* (2006.01)
(52) U.S. Cl. ...................... 358/1.9; 358/3.26; 348/241; 382/274; 355/52
(58) Field of Classification Search ................ 358/1.9, 358/448, 461, 3.26; 382/162, 167, 254, 274; 359/728; 348/222.1, 241, 251; 355/52
See application file for complete search history.

(56) References Cited

U.S. PATENT DOCUMENTS

| | | | |
|---|---|---|---|
| 4,979,042 A | | 12/1990 | Vogel |
| 6,195,469 B1 | | 2/2001 | Nishioka et al. |
| 6,219,446 B1 | * | 4/2001 | Kiriki et al. .................. 348/241 |
| 6,233,403 B1 | * | 5/2001 | Aratame et al. ................ 396/6 |
| 6,333,826 B1 | * | 12/2001 | Charles ....................... 359/728 |
| 2001/0031139 A1 | * | 10/2001 | Kamata et al. ................. 396/6 |
| 2002/0030797 A1 | * | 3/2002 | Enomoto ...................... 355/52 |
| 2004/0150726 A1 | * | 8/2004 | Gallagher ................ 348/222.1 |
| 2005/0179793 A1 | * | 8/2005 | Schweng .................... 348/251 |
| 2007/0065004 A1 | * | 3/2007 | Kochi et al. ................ 382/162 |

FOREIGN PATENT DOCUMENTS

| | | |
|---|---|---|
| DE | 19913311 | 9/1999 |
| EP | 1 045 573 A2 | 10/2000 |
| EP | 1 160 626 A1 | 5/2001 |
| EP | 1 134 967 A2 | 9/2001 |
| EP | 03 01 4204 | 10/2003 |
| JP | 2000-209496 | 7/2000 |
| JP | 2003069818 | 7/2003 |

* cited by examiner

*Primary Examiner*—Kimberly Williams
(74) *Attorney, Agent, or Firm*—Fulbright & Jaworski LLP

(57) ABSTRACT

An image correction processing apparatus for correcting a pixel value of each pixel constituting image data obtained from an original image affected by the peripheral light-off is disclosed. The apparatus includes a pixel coordinate transforming unit for converting a distance between each pixel of a group of pixels which have an equal amount of peripheral light amount reduction and which are located on a common contour line of an oval about a predetermined reference pixel located at the center thereof and said predetermined reference pixel into a radius of a true circle having a diameter corresponding to the major axis of the oval; a $\cos^4$ calculating unit for obtaining, for each pixel, an angle value thereof in proportion to the radius obtained by the conversion and then obtaining a $\cos^4$ value of the angle value; and a correction calculating unit for multiplying an inverse of said $\cos^4$ value obtained for each pixel by a pixel value of this pixel, thereby to obtain a corrected pixel value for the pixel.

7 Claims, 10 Drawing Sheets

IMAGE CORRECTION PROCESSING METHOD AND APPARATUS FOR CORRECTING IMAGE DATA OBTAINED FROM ORIGINAL IMAGE AFFECTED BY PERIPHERAL LIGHT-OFF

BACKGROUND OF THE INVENTION

1. Field of the Invention

The present invention relates to an image correction processing method and apparatus for correcting a pixel value of each pixel constituting image data obtained from an original image affected by a so-called "peripheral light-off phenomenon". The invention relates also to a program for implementing such method executable by a computer as well as to a program storage medium storing the computer-executable program. In particular, the invention relates to an art for correcting a pixel value of each pixel of image data obtained from an original image when the original image recorded on a photographic film is read as digital image data and then a print paper is exposed according to the data by a digital exposure technique.

2. Description of the Related Art

Conventionally, a photographic printing operation has been done by the analog exposure (projection exposure) technique wherein light is irradiated on a photographic film recording an original image and the light transmitted through the image-bearing film is irradiated on a print paper for obtaining a print of the image. In recent years, the digital exposure technique has been employed. In this case, an image recorded on a photographic film is read by e.g. a scanner to obtain digital image and then for each pixel, respective single color components of red, blue and green are irradiated on the print paper for obtaining a print.

On the other hand, in the case of a photography made by using e.g. a disposable camera ("one-time-use camera"), the image recorded on a film by such camera sometimes suffers density irregularity with its brightness progressively decreasing in the direction away from the center of the image. This phenomenon, referred to as the "peripheral light-off", results from light amount irregularity due to aberration of the lens of the camera and/or insufficient light amount of a flash bulb of the camera used in a flash photography.

The light amount irregularity due to the lens aberration of a camera can occur in a following situation for instance. In general, when a photography is taken with an open aperture, the resultant photographed image will be significantly influenced by the lens aberration. In this case, in the image area on the film, the light amount gradually decreases in the direction away from the center of the image. Especially, in the case of such inexpensive cameras as the disposable cameras noted above, they often employ a lens having a relatively large aberration and they usually lack any aperture adjusting mechanism also. Therefore, with such cameras, the problem of light amount reduction in the peripheral areas of the image (peripheral light-off) tends to appear more conspicuously.

Needless to say, if an image recorded on a film with the influence of peripheral light-off is printed as it is on a print paper by the digital exposure or analog exposure, the resultant print also will be affected by the peripheral light-off, so that a quality print cannot be obtained.

In an attempt to cope with the above-described problem of image quality deterioration due to peripheral light-off phenomenon, the convention has sometimes implemented a technique called "mask printing". This mask printing is a technique wherein during the exposure a portion of a film image is covered with a mask for varying an exposure time according to respective areas of the image. More particularly, if such reduction of light amount is present in the peripheral areas of the image, there is provided a period when the exposure is effected with the central area of the image being covered with the mask so that the exposure time of the central area may be shorter than that of the peripheral areas.

With such mask printing technique, however, there inevitably occurs discontinuity in the exposure amount in the border area in the image between the masked area and the non-masked area. On the other hand, the reduction of light amount in the peripheral areas (peripheral light-off) basically occurs in a continuous manner. Hence, a printed image obtained by this technique will appear "unnatural".

In order to avoid such discontinuity in the exposure amount, the convention has also proposed to employ a special filter adapted for providing continuously varying transmission light amount as the mask to be employed in the mask printing technique. That is, for such film image bearing the influence of peripheral light amount reduction, for exposure of this film, there is employed a filter adapted for providing a small transmission light amount to the central area of the image while providing a progressively large transmission light amount to the peripheral areas thereof away from the central area. With this modified mask printing technique, the discontinuity of exposure amount can be avoided, so that a reasonably good quality of print can be obtained.

However, the reduction of peripheral light amount differs in degree for each of a plurality of images recorded on a film. Therefore, for appropriate correction of the peripheral light amount reduction, it is necessary to prepare a great number and many kinds of such filters for selective use. And, the selection of a best suited filter for each image is difficult and troublesome. And, the preparation of many filters invites disadvantageous cost increase. Moreover, even if such great number and kinds of filters are made ready for use, it is still difficult to achieve perfect match between one particular filter and a particular degree of peripheral light amount reduction present in each image.

In the case of the digital exposure, to cope with the same problem as above, the convention has proposed a technique in which when an image on a photographic film is read by a scanner or the like, a correction is made, if instructed by an operator, for increasing pixel values of pixels of the peripheral areas of the image and then this corrected image data is transmitted to an image processing unit for subsequent processing.

The above technique, however, depends simply on the selection between effecting the correction (for increasing the pixel values for the peripheral areas of the image) and not effecting it. Hence, this technique fails to provide appropriate correction according to each particular degree of peripheral light amount reduction present in each image. For certain types of images, the technique can hardly provide any correction effect to them at all.

Moreover, the correction made on the read data does not necessarily cope with each particular degree of peripheral light amount reduction in each image, that is, variation in the peripheral light amount. Therefore, such correction technique may even render the image data "unnatural" rather than "more natural".

SUMMARY OF THE INVENTION

In view of the above-described state of the art, the object of the present invention is to provide an image correction processing method, apparatus and a program for computer-implementing the method and a storage medium storing the program, which can appropriately and effectively correct or compensate for the influence of reduction of light amount in a peripheral area, that is, the peripheral light-off phenomenon, if any in an original image.

For accomplishing the above-noted object, according to one aspect of the present invention, there is proposed an image correction processing method for correcting a pixel value of each pixel constituting image data obtained from an original image affected by the peripheral light-off, the method comprising the computer-implemented steps of:

(1) converting a distance between each pixel of a group of pixels which have an equal amount of peripheral light amount reduction and which are located on a common contour line of an oval about a predetermined reference pixel located at the center thereof and said predetermined reference pixel into a radius of a true circle having a diameter corresponding to the major axis of said oval;

(2) for each pixel, obtaining an angle value thereof in proportion to said radius obtained at said converting step and then obtaining a $\cos^4$ value of said angle value; and (3) multiplying an inverse of said $\cos^4$ value obtained for each pixel by a pixel value of this pixel, thereby to obtain a corrected pixel value for said pixel.

As described hereinbefore, a photographic image obtained by e.g. a disposable camera sometimes suffers the disadvantageous influence of the peripheral light-off characterized by progressively decreasing light amount away from the center to the periphery thereof. As also described hereinbefore, this peripheral light-off phenomenon can result from various causes, of which the lens aberration of the camera is the most influential. And, the peripheral light-off phenomenon due to this lens aberration is governed by the so-called "$\cos^4$ law".

Further, in the case of e.g. disposable cameras, in order to avoid distortion of an image to be recorded on its film, the film per se is set under a curved state with its right and left portions thereof being set closer to the lens than the center portion. For this reason, the reductions in the peripheral light amounts of the pixels, which would occur otherwise (i.e. without such curving of film) along concentric true circle contour lines, occur along concentric oval contour lines And, such phenomenon may occur also due to other causes such as the shape of the lens, the shutter mechanism, etc. employed in the photography Considering these facts, according to the above-described method of the invention, the method effects a conversion process for converting a distance between each pixel of a group of pixels which have an equal amount of peripheral light amount reduction and which are located on a common contour line of an oval about a predetermined reference pixel located at the center thereof and said predetermined reference pixel into a radius of a true circle having a diameter corresponding to the major axis of said oval. That is, the distance between each pixel on a common oval contour line and the predetermined reference pixel is converted into a radius of a true circle centering about the predetermined reference pixel. In other words, this process is a coordinate transformation of the peripheral light amount reduction distribution in the form of an oval into peripheral light amount reduction distribution in the form of a circle. With this operation, a group of pixels located on each common oval contour and thus having a same amount of peripheral light reduction effect will be treated as a group of pixels having a same distance (having a same radius) from the predetermined reference pixel After the radius (i.e. the distance from the predetermined reference pixel to each pixel after the coordinate transformation) is obtained in the manner above, an angle value proportional to this radius is obtained and then a cosine fourth-power ($\cos^4$) value of this angle value is calculated. Thereafter, an inverse of this $\cos^4$ value is multiplied by a pixel value of each pixel, whereby a corrected pixel value of this pixel is obtained.

With the above-described operation comprising the steps of converting the distance between each pixel on an oval contour line and the predetermined reference pixel (e.g. the center of the image) into a radius of a true circle along which the reduction of same amount of peripheral light would occur in the case of absence of e.g. the curving of the film, and calculating an inverse of a $\cos^4$ value of the resultant converted value (radius) and then multiplying the inverse by the pixel value of each pixel, the peripheral light amount reduction is compensated for. Therefore, with this method, the effect of peripheral light amount reduction (peripheral light-off) present in an original image can be corrected appropriately.

Incidentally, the predetermined reference pixel is a pixel which is to be determined according to particular condition of the peripheral light amount. In actuality, this pixel can be a variety of pixels in an image.

Further, the above-described image correction processing method of the invention contemplates also a case where the oval has a predetermined angular inclination relative to the original image. Namely, in some original images, the reductions in the peripheral light amount occur along concentric oval contour lines having a certain fixed inclination, which means that the group of pixels having a same amount of peripheral light reduction are located along an obliquely inclined oval. Such inclination can be coped with by taking this into the above-described coordinate transformation operation. Therefore, in such case of the group of pixels of a same peripheral light reduction amount being present on an inclined oval in the original image, the method of the present invention can appropriately and effectively compensate for this peripheral light amount reduction.

According to one preferred embodiment of the image correction processing method relating to the present invention, a proportional coefficient used in the calculation of the angle value in proportion to the radius is determined according to each particular condition of the peripheral light amount reduction present in the original image. When peripheral light amount reduction is present in original images of a film, the degree of this reduction differs from one frame image to another. Then, according to the above method, the proportional coefficient for use in the calculation of the angle value proportional to the radius is used as a variable which varies according to the degree of the peripheral light amount reduction. With this, the method can always ensure optimal correction even if the degree of peripheral light amount reduction differs from one image to another.

According to another preferred embodiment of the image correction processing method relating to the present invention, a proportional coefficient used in the calculation of the angle value in proportion to the radius is determined according to each type of the camera used for obtaining the original image. For instance, if the original image was obtained by using a simple camera such as a disposable camera having a lens of not so high quality and this camera does not have an aperture adjusting mechanism or zooming mechanism, the peripheral light amount reduction due to the aberration of the lens will occur in the same or similar manner and degree for all the original images obtained thereby. Then, if the proportional coefficient is determined according to the type of the camera used for obtaining the original images as proposed by the above-described method, it becomes possible to set a proportional coefficient best suited for the correction simply by setting the coefficient according to the camera type. Therefore, this method can eliminate such trouble of e.g. an operator setting the proportional coefficient for each image while monitoring the corrected image. The method can also achieve reduction in the time required for the correction processing.

For accomplishing the above-noted object, according to a further aspect of the present invention, there is proposed an image correction processing apparatus for correcting a pixel value of each pixel constituting image data obtained from an original image affected by the peripheral light-off, the apparatus method comprising:

(1) a pixel coordinate transforming unit for converting a distance between each pixel of a group of pixels which have an equal amount of peripheral light amount reduction and which are located on a common contour line of an oval about a predetermined reference pixel located at the center thereof and said predetermined reference pixel into a radius of a true circle having a diameter corresponding to the major axis of said oval;

(2) a $\cos^4$ calculating unit for obtaining, for each pixel, an angle value thereof in proportion to said radius obtained by said conversion and then obtaining a $\cos^4$ value of said angle value; and (3) a correction calculating unit for multiplying an inverse of said cos4 value obtained for each pixel by a pixel value of this pixel, thereby to obtain a corrected pixel value for said pixel.

With the above construction, this image correction processing apparatus can achieve the same function/effect as achieved by the foregoing method of the invention.

In addition to the above, the invention provides an image processing program for computer-implementing or realizing the above-described image correction processing method or the image correction processing apparatus as well as a storage medium storing this image processing program therein.

Further and other features and advantages of the invention will appear upon reading the following description of presently preferred embodiments thereof with reference to the accompanying drawings.

DESCRIPTION OF THE PREFERRED EMBODIMENTS

Figure 1:
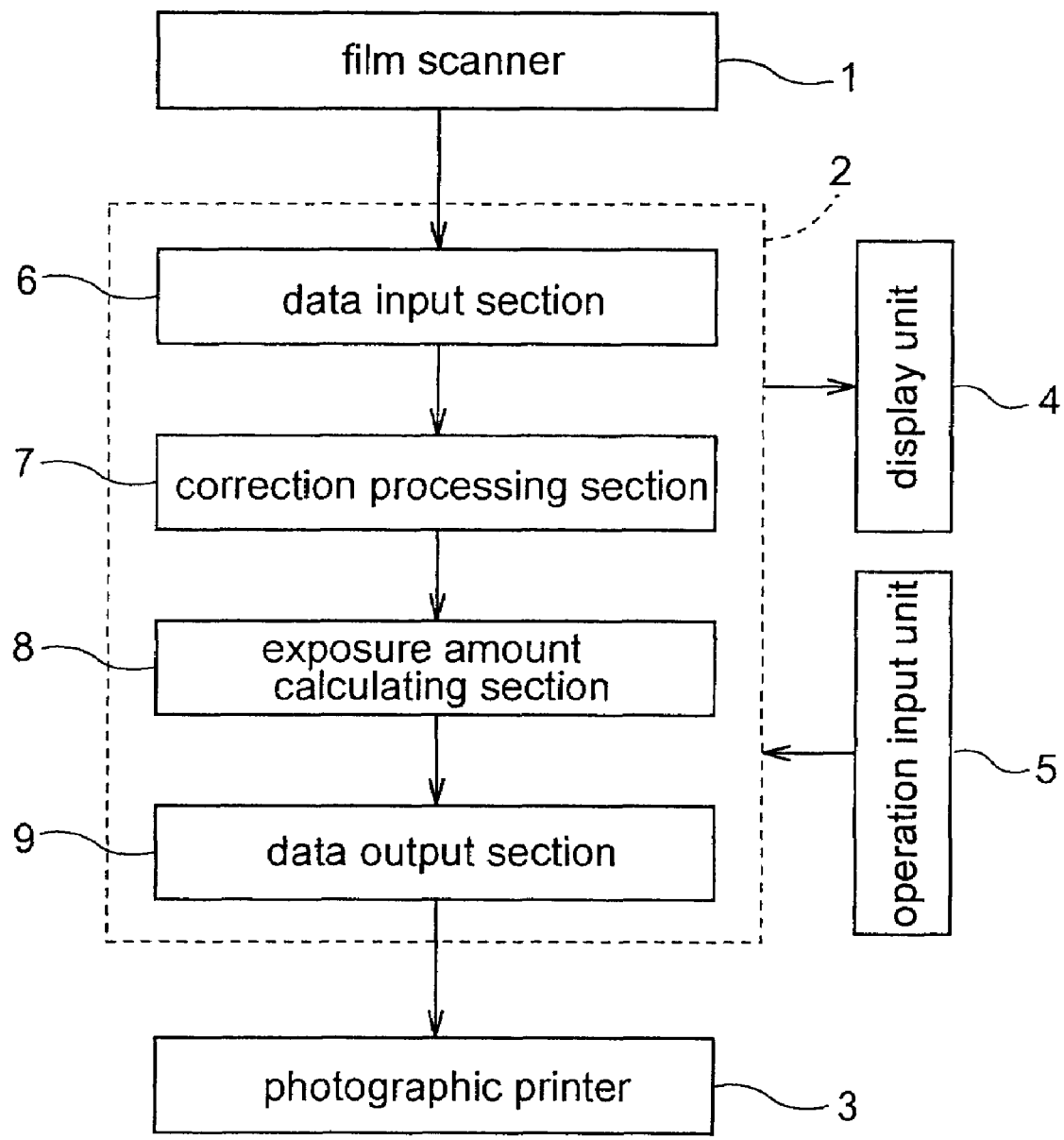
FIG. 1 is a block diagram showing a general construction of an image outputting system.

FIG. 1 is a block diagram showing a general schematic construction of an image outputting system relating to one preferred embodiment of the present invention. This image outputting system includes a film scanner 1, an image processor 2, a photographic printer 3, a display unit 4 and an operation input unit 5.

The film scanner 1 is operable to irradiate light from a light source on to a negative film as an example of a photographic film and then to receive its transmission light by means of e.g. CCD (charge coupled device), thereby to read each image recorded on the negative film. Then, the film scanner 1 transmits the read image data, for each color component of red, green ad blue, to the image processor 2.

The photographic printer 3 exposes a print paper as a photosensitive material according to the processed image data received from the image processor 2, thereby to print images on the print paper. As a head for irradiating light beam corresponding to the image data on to the print paper, the printer 3 employs an optical modulator, which can be a PLZT exposing head, DMD (digital micro-mirror device), LCD (liquid crystal display), LED (light emitting diode) panel, laser, FOCRT (fiber optic cathode ray tube), CRT (cathode ray tube), etc.

The photographic printer 3 can be an automatic printer capable of effecting both the scanning of the negative film and the exposure of the print paper. In this case, if the image outputting system is constructed as an interfaced assembly of the automatic printer for effecting the reading of the original image and its printing and the image processor 2 comprised of e.g. a PC (personal computer), the entire system can be constructed simple.

The image processor 2 effects correction of peripheral light-off phenomenon effect on the image data received from the film scanner 1 and then transmits this corrected image data to the photographic printer 3. The image processor 2 includes a data input section 6, a correction processing section 7, an exposure amount calculating section 8 and a data output section 9.

The data input section 6 is a functional block for inputting the image data transmitted from the film scanner 1. For instance, if the film scanner 1 and the image processor 2 are connected via a SCSI (small computer system interface), the SCSI unit becomes this data input section 6. If image data is inputted from an image pick-up device such as a digital camera capable of directly generating image data, its image data is transmitted from the image pick-up device to the data input section 6 of the image processor 2, not via the film scanner 1, but via a semiconductor storage medium or via a communication network.

The correction processing section 7 is a functional block for effecting correction calculation on the image data inputted from the data input section 6 for compensating for the effect of peripheral light-off phenomenon if any in the data. If the image processor 2 is provided as a PC (personal computer) for example, this correction processing section 7 will be realized as a program (software) or a hardware adapted mainly for effecting that correction calculation.

Figure 2:
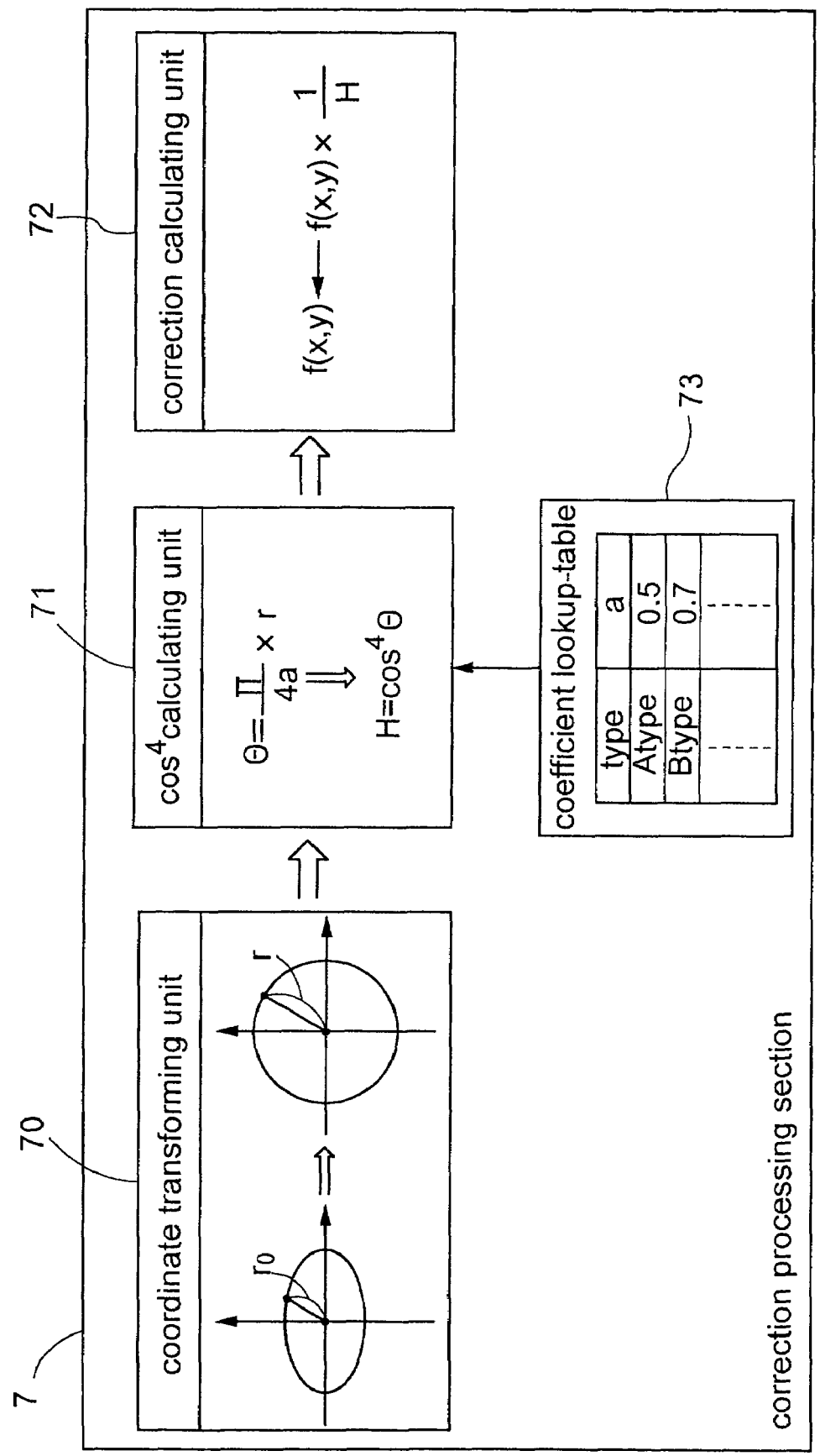
FIG. 2 is a functional block diagram showing respective functional blocks included in a correction processing unit.

As may be apparent from the functional block diagram of FIG. 2 showing functional blocks of the correction processing section 7, this correction processing section 7 includes a pixel coordinate transforming unit 70, a $\cos^4$ calculating unit 71, a correction calculating unit 72 and a coefficient lock-up table 73. The pixel coordinate transforming unit 70 is configured for converting a distance between each pixel of a group of pixels which bear an equal amount of peripheral light amount reduction effect and which are located on a common contour line of an oval about a predetermined reference pixel located at the center thereof and said predetermined reference pixel into a radius of a true circle having a diameter corresponding to the major axis of said oval. The $\cos^4$ calculating unit 71 is configured for obtaining, for each pixel, an angle value thereof in proportion to said radius obtained by said conversion and then obtaining a $\cos^4$ value of said angle value. The correction calculating unit 72 is configured for multiplying an inverse of said $\cos^4$ value obtained for each pixel by a pixel value of this pixel, thereby to obtain a corrected pixel value for said pixel. The coefficient look-up table 73 stores therein a plurality of proportional coefficients for use in the $\cos^4$ calculating unit 71 for a plurality of types of photographic cameras, respectively. Details of the image correction processing carried out by these respective functional blocks of the correction processing section 7 will be discussed later herein.

The exposure amount calculating section 8 is a functional block for calculating an exposure amount for use in the exposure operation at the photographic printer 3 according to the image data corrected at the correction processing section 7 or to non-corrected image data. This exposure amount calculating section 8 too will be realized as execution of the program for correction calculation, if the image processor 2 is constructed as a PC.

The data output section 9 is a functional block for outputting exposure amount data obtained at the exposure amount calculating section 8 to the photographic printer 3. For example, if the image processor 2 and the photographic printer 3 are interconnected via such data transmission protocol as the SCSI or USB, the interface unit corresponding thereto becomes this data output section 9.

Further, the image processor 2 is connected to the display unit 4 and the operation input unit 5. The display unit 4 is a component adapted for displaying the image data inputted from the film scanner 1 to the image processor 2 or the corrected image data obtained after the correction process of this image data. This display section 4 is a monitor device which can be a CRT (cathode ray tube), an LCD (liquid crystal display), or the like.

The operation input unit 5 is a component for allowing an operator to input various instructions. This unit 5 can be a key input means such as a keyboard or a pointing device such as a mouse.

Next, the correction processing effected by the image processor 2 will be described in details. First, there will be described the peripheral light-off phenomenon which can occur in an image recorded on a photographic film. As described hereinbefore, when a photography is made by such a camera as a disposable camera which often employs a lens having a relatively large lens aberration, there tends to occur density irregularity in the resultant image with peripheral areas thereof becoming progressively darker as being away from the center area thereof, i.e. the peripheral light-off phenomenon.

Figure 3:
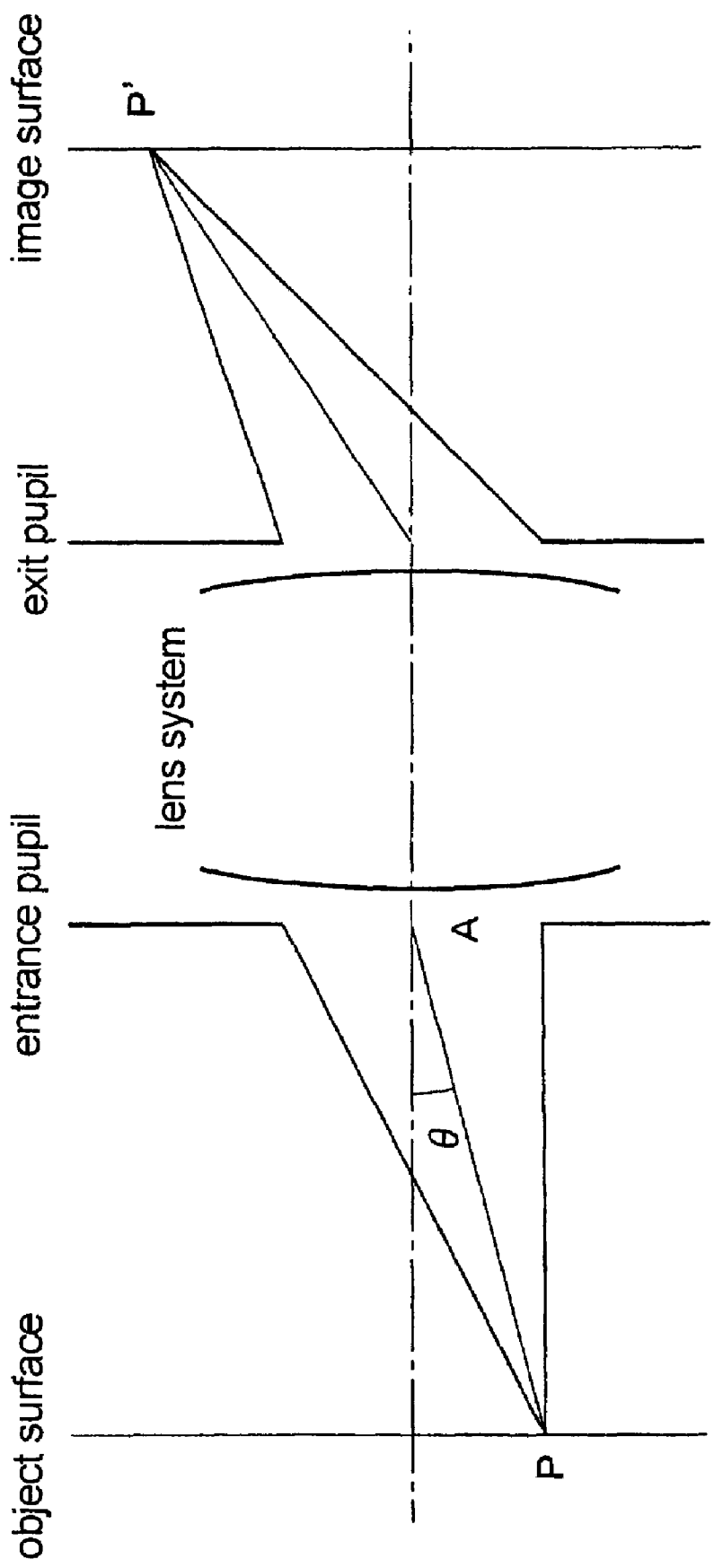
FIG. 3 is an explanatory view illustrating positional relationship among various components including an object surface, lens (system), an image surface under the $\cos^4$ law.

In general, a light amount of an image surface confronting a flat object surface perpendicular to the lens axis, with the proviso of the object surface being a uniform diffusing surface, is proportional to a $\cos^4$ of an angle $\theta$ formed between the center of the entrance pupil of the lens and a point on the object viewed therefrom. This is known as the "$\cos^4$ law". FIG. 3 is an explanatory view explaining this $\cos^4$ law by way of illustration of the positional relationship among the object surface, lens (system), the image surface, etc. Incidentally, to be more precise, the above angle $\theta$ refers to an angle formed between a straight line connecting a point P on the object surface corresponding to a point P' on the image surface to the center A of the entrance pupil and the optical axis of the lens system.

Figure 4:
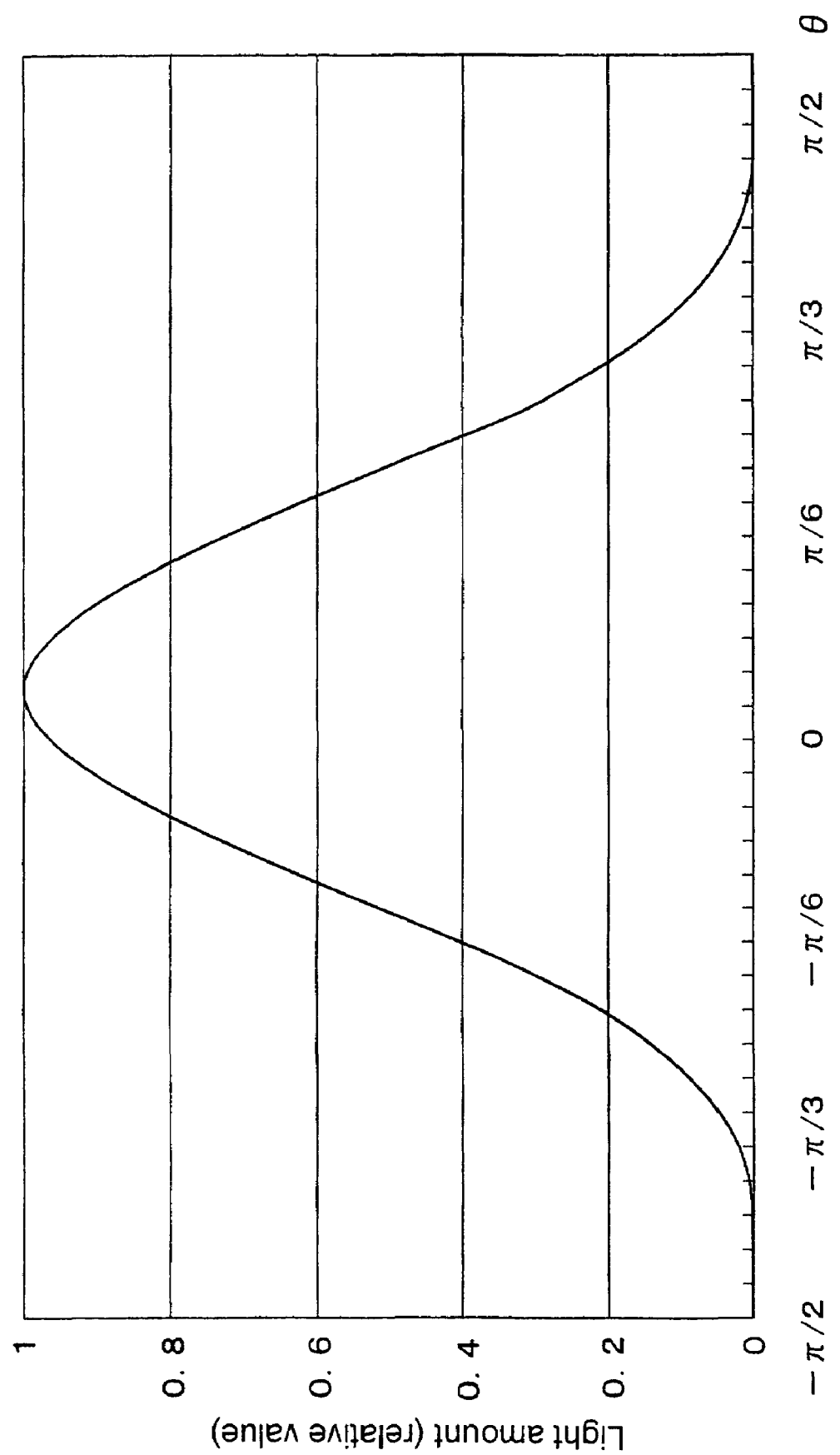
FIG. 4 is a graph illustrating the $\cos^4$ law, the horizontal axis representing angle θ and the vertical axis representing light amount of the image surface.

Further, FIG. 4 is a graphic illustration of the $\cos^4$ law, with the horizontal axis representing the angle $\theta$ and the vertical axis representing the light amount on the image surface. Each value on the vertical axis of this graph denotes a relative value of the light amount relative to a light amount of 1 provided when the angle $\theta$ is 0, that is, the light amount provided when a light beam parallel to the optical axis is irradiated on the image surface. This graph illustrates that the light amount is in proportion to the $\cos^4$ value of the angle $\theta$.

Based on the above, let us now suppose that the peripheral light-off occurring in an image recorded on a photographic film is governed by the $\cos^4$ law described above. Then, there will be described a method of correcting this peripheral light-off by multiplying image data by an inverse of this $\cos^4$ value.

As described above, supposing the reduction in the peripheral light amount in an image is governed by the $\cos^4$ law, in the image data of the image read by the film scanner 1, the center of the image has a high pixel value and this pixel value progressively decreases in the direction away from the center. Namely, considering a plurality of concentric circles about the center of the image, the greater the radius of a concentric circle, the lower the pixel value. Therefore, for effecting the correction of the peripheral light-off phenomenon, no correction is made on a pixel value of the pixel located at the center of the image and for pixels away from the center, correction is made thereon by multiplying each pixel value thereby by an inverse of $\cos^4$ value of its distance from the center.

First, suppose that dat (x, y) is a pixel value of each pixel of image data inputted to the data input unit 6 of the image processor 2. In this, if this image data inputted to the data input section 6 comprises color image data, that is, image data of respective color components of red, green and blue, the above pixel value: dat (x, y) comprises an average value of the respective color components of that pixel, that is, a value corresponding to density. Also, (x, y) represents coordinates of that pixel.

And, if the pixel value of each pixel after the correction (corrected pixel value) is represented by: Dat (x, y), this Dat (x, y) is calculated by the following expressions.

$$Dat\ (x,y) = dat\ (x,y)/(\cos\theta)^4 \quad (1)$$

$$\theta = \pi r/4a \quad (2)$$

In the above expressions, r denotes a normalized value of the distance of the subject pixel from the center of the image. That is to say, $\pi r/4a$ is a coefficient (proportional coefficient in this case) for use in determining $\theta$ with using: r as a parameter. And, a: denotes a coefficient which determines how much correction is to be made.

Next, the r in the above expressions will be described. This r: denotes the distance of a subject pixel from the image center when the inputted image data has a diagonal distance of 1. Hence, for the pixels located at the four corners of the rectangular image which have the greatest distance from the image center, there is established: r=0.5. Therefore, the possible range of this r is: $0 \leq r \leq 0.5$.

Now, suppose that the original image data comprises a matrix of pixels of: M×N (M: the number of pixels in the row, N: the number of pixels in the column). Then, the above: r is represented by the following expression (3).

$$r \approx \sqrt{[\{(x-M/2)2+(y-N/2)2\}/(M2+N2)]} \quad (3)$$

Next, the above coefficient: a will be described. If peripheral light amount reduction (peripheral light-off) is present in the original images, the degree of that reduction will vary for each image. For instance, in a certain image, pixels in the peripheral area may have significantly reduced pixel values relative to the pixel values of the pixels at or adjacent the center of the image. Whereas, in another image, such reduction of pixel values of the pixels in the peripheral areas relative to those of the pixels at or adjacent the image center may be very small. Although the degree of reduction in the peripheral light amount varies for each image as described above, it still may be considered that for all images, the reduction is substantially governed by the $\cos^4$ law, that is the reduction is substantially in proportion to the $\cos^4$ value of the distance of from the image center.

Figure 5:
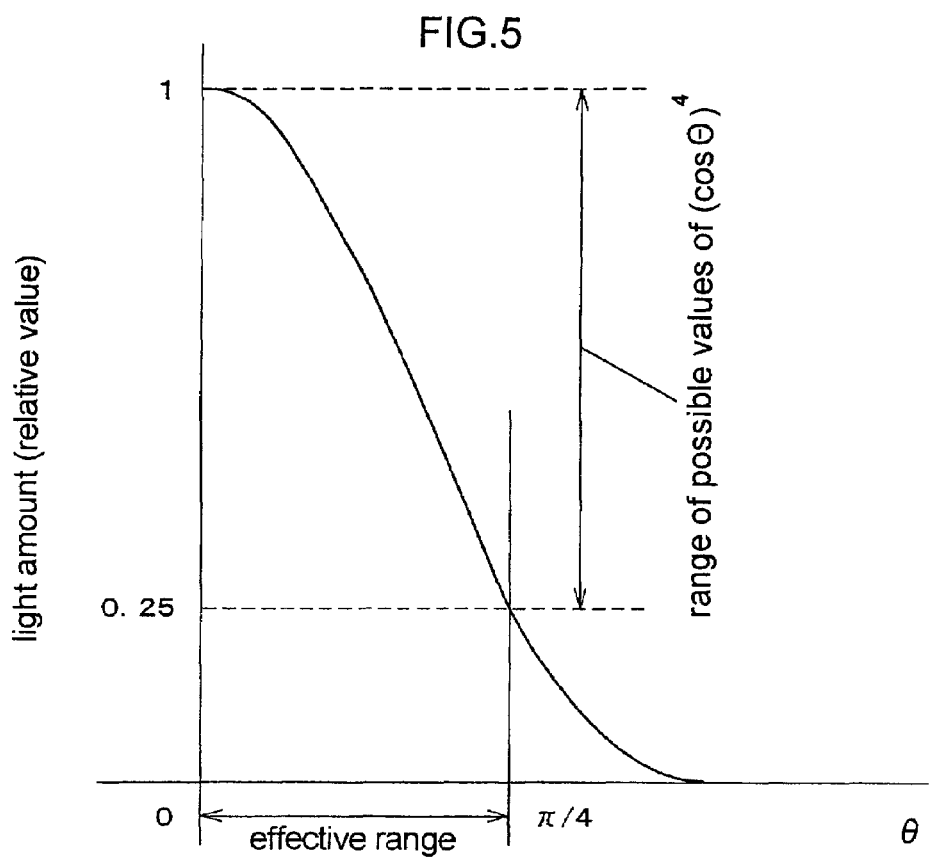
FIG. 5 is an explanatory view illustrating that in the graph of the $\cos^4$ law, an effective range of θ is set, thereby to set a range of possible values of $(\cos \theta)^4$.

Then, in this embodiment, as shown in FIG. 5, the effective range of $\theta$ is set in accordance with the condition of the peripheral light amount reduction, thereby to set the possible value of $(\cos\theta)^4$. For instance, if the reduction in the peripheral light amount is found significant, a relatively large effective range of $\theta$ is set so as to extend the range of the possible values of $(\cos\theta)^4$, which is equivalent to increasing the degree of correction of pixel values of the pixels in the peripheral area. Conversely, if the reduction in the peripheral light amount is found small, a relatively small effective range of $\theta$ is set so as to narrow the range the possible values of $(\cos\theta)^4$, which is equivalent to decreasing the degree of correction of pixel values of the pixels in the peripheral area.

Figure 6:
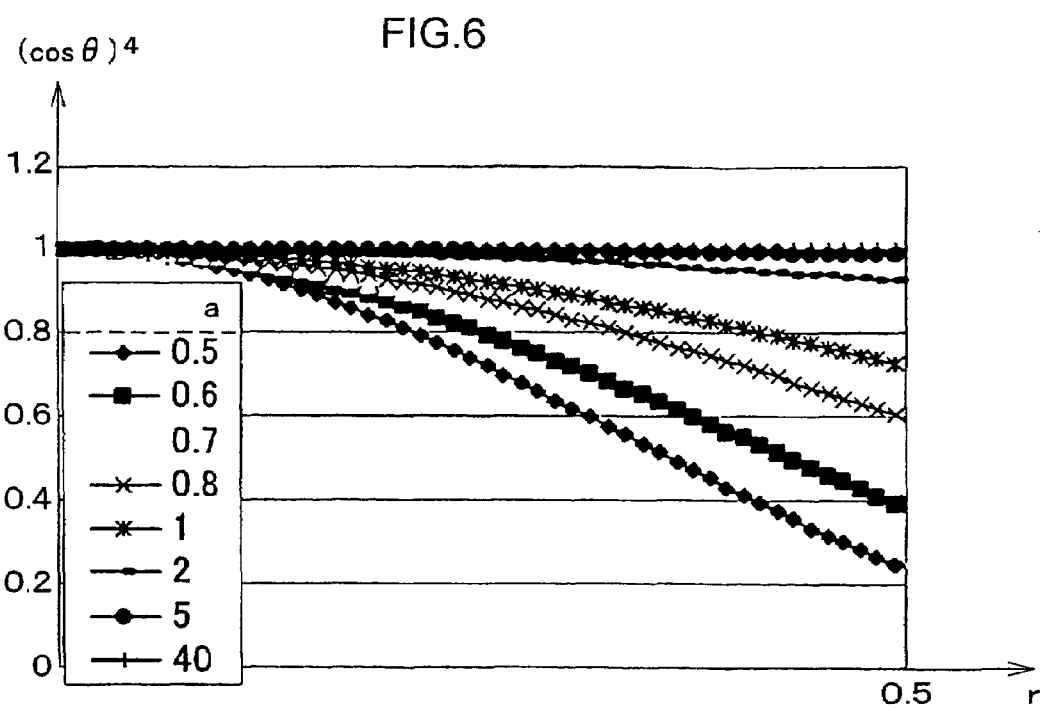
FIG. 6 is a graph showing the possible value of $(\cos \theta)^4$ relative to a reference value: r in accordance with variation of a coefficient: a, FIG. 7 is a schematic plan view illustrating formation of a photographic image on a curved film face in a photographic camera.

In this, $\theta$ is obtained by the above-described expression (2). In this expression, r has the maximum value of 0.5 for a pixel farthest from the image center and has the minimum value of 0 for the pixel located at the image center. That is, $0 \leq r \leq 0.5$. Therefore, as shown also in FIG. 6, by varying the coefficient: a, it is possible to vary the value of $(\cos\theta)^4$ for each value of r.

Suppose the coefficient: a is set now to 0.5. Then, at the point farthest from the image center (r=0.5), $\theta$ becomes $\pi/4$. Therefore, there occurs peripheral light-off of $(\cos(\pi/4))^4$. Then, by multiplying the pixel value by an inverse of this value, it is possible to compensate for the peripheral light-off. In other words, by setting the value of the coefficient: a to 0.5, it becomes possible to appropriately compensate for the peripheral light-off phenomenon which occurs with use of a lens having a half view angle of 45 degrees. Similarly, by setting the value of the coefficient: a to 1, at the point farthest from the image center (r=0.5), $\theta$ becomes $\pi/8$. That is, by setting the value of the coefficient: a to 1, it becomes possible to appropriately compensate for the peripheral light-off phenomenon which occurs with use of a lens having a half view angle of 22.5 degrees. In these manners, by varying the value of the coefficient: 1, it is possible to compensate for the peripheral light-off phenomenon effect in accordance with the condition of the reduction in the peripheral light amounts in each image.

Incidentally, for example, as shown in FIG. 5, it is possible to set the upper limit of the possible range of $\theta$ to $\pi/4$. With such setting of the upper limit for $\theta$, it becomes possible to avoid the inconvenience that the value of $(\cos\theta)^4$ becomes so small as to cause the values of Dat (x, y) to exceed the predetermined capacity of the memory, i.e. overflow condition of the memory.

The foregoing description concerns the correcting method for the case where the pixel values become smaller in proportion to the $\cos^4$ as departing from the image center, that is, where the peripheral light-off occurs along a plurality of concentric true circles about the image center with the greater the radium of the concentric circle, the lower the pixel value of the pixels located on that circle. However, the peripheral light-off phenomenon, that is, the reduction in the light amounts in the peripheral areas of the image, does not always occur along such concentric circles.

Figure 7:
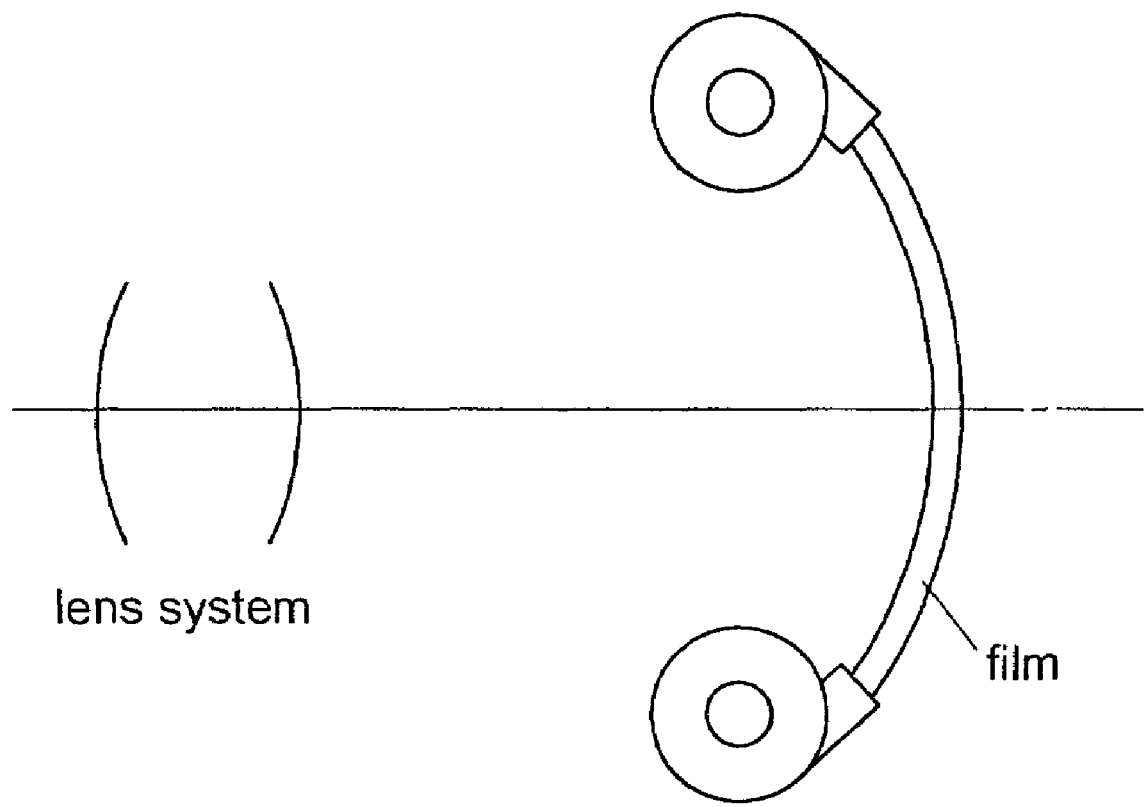
Figure 8:
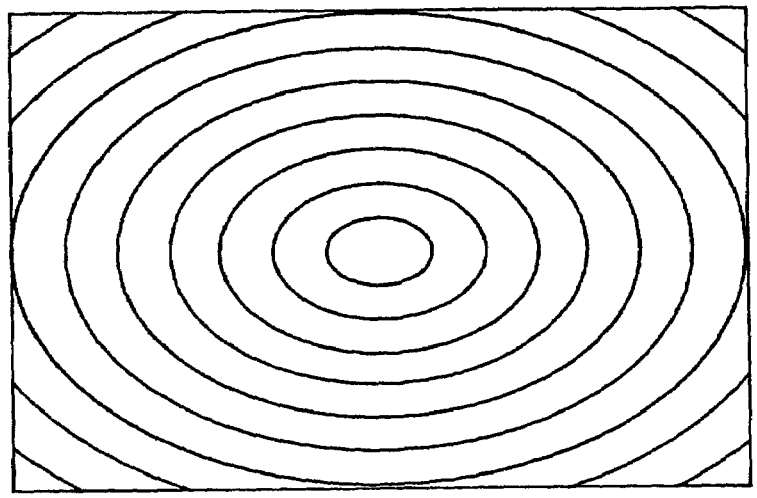
FIG. 8 is an explanatory view illustrating occurrence of peripheral light amount reductions along concentric oval contour lines.

Especially, in the case of a disposable (one-time-use) camera or the like, in order to avoid distortion in an image to be recorded on its film, as shown in FIG. 7, the film is usually set in the camera under a longitudinally curved condition with the center of the film being located away from the lens. That is, in this curved condition, the right and left portions of a film frame on which an image of a photographic subject is projected at a reference photography position of the camera are set to be closer to the lens. For this reason, as shown in FIG. 8, the peripheral light-off (denoted by contour lines in FIG. 8) will occur not along concentric true circles, but along concentric ovals (oval contour lines). Incidentally, such peripheral light-off in the form of concentric ovals occurs also due to other causes such as the shape of the lens, the shutter mechanism, etc.

Then, there will be described next this invention's characterizing method of correcting peripheral light-off phenomenon which occurs in the form of such concentric oval contours.

Figure 9:
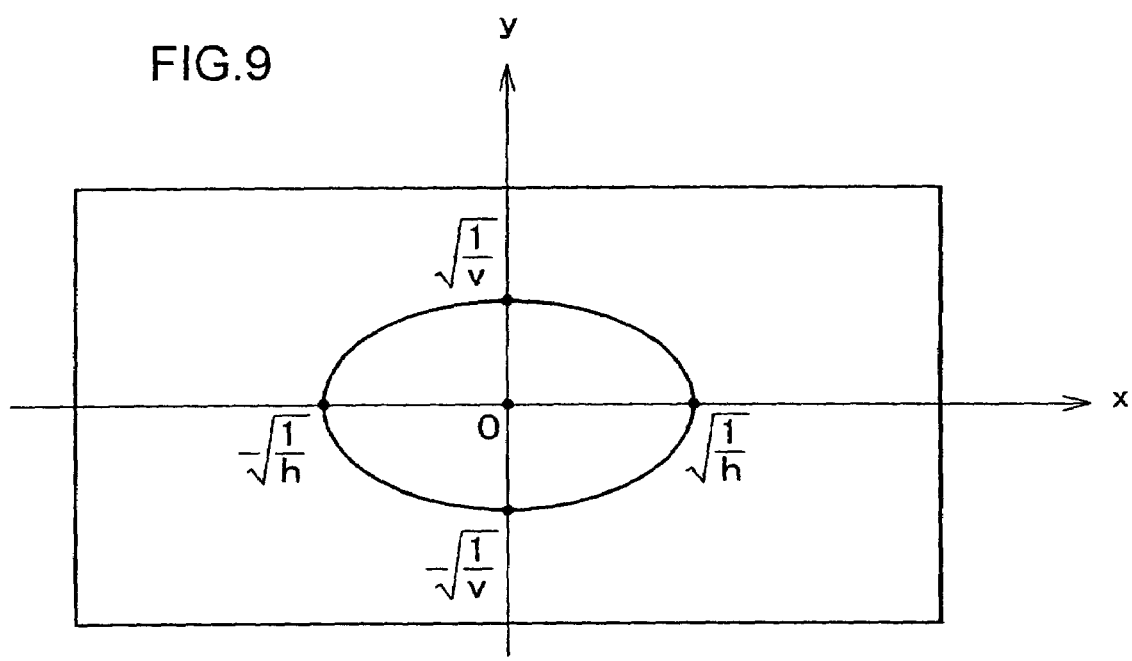
FIG. 9 is an explanatory view showing a group of pixels of a same amount of peripheral light amount reduction located along a common oval.

First, suppose a group of pixels located along an oval expressed by the following expression (4) suffer a same amount of peripheral light amount reduction (peripheral light-off). In this expression, marks h, v are coefficients. Also, in the coordinate system of this expression (4), as shown in FIG. 9, the x axis and the y axis are set to be parallel with the outermost peripheral sides of the original image with the center of the image being the origin O of the system.

$$hx2+vy2=1 \quad (4)$$

Here, if each pixel value of respective pixel on the oval were corrected by using the foregoing expressions (1) and (2), this would cause a problem. Namely, since the contour line is represented by an oval, for a same distance from the reference point (e.g. the center of the image), the peripheral light-off ratios would be different between the x direction and the y direction.

Figure 10:
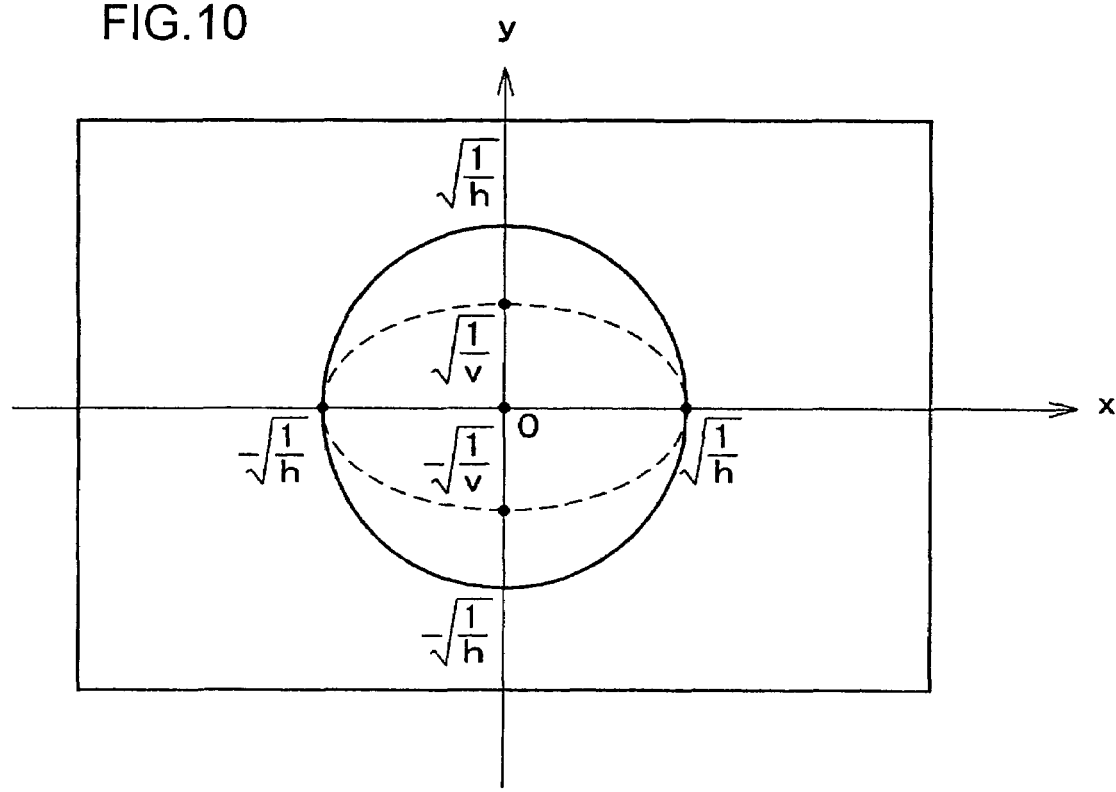
FIG. 10 is an explanatory view showing a group of pixels of a same amount of peripheral light amount reduction located along a true circle as corresponding pixels located along an oval, the true circle being formed in the case of absence of e.g. curving of the film.

For appropriate correction of the peripheral light-off, it is essential that a pixel value of each of a group of pixels located on a common oval contour line be multiplied by a same correction coefficient. Then, according to this embodiment, a coordinate transformation operation is effected for transporting the oval contour line into a true circle contour line. This coordinate transformation will be illustrated next with reference to FIG. 10. Namely, as shown in FIG. 10, the method utilizes a radius of a true circle having a same amount or degree of peripheral light-off as the respective pixels on the oval. More particularly, the radius of a true circle expressed by the following expression (5) is used as a value of one r which is a normalized value. In other words, a half of the length of the major axis of the oval is used as the value of r.

$$x^2+y^2(1/\sqrt{h})^2 \quad (5)$$

Next, by using the above value of r, θ is derived from the expression (2). And, as shown by the foregoing expression (1), for each pixel on the oval, its pixel value is multiplied by a same correction coefficient: $(1/(\cos θ)^4)$. With this, the pixel value of each pixel on the oval can be corrected appropriately.

Alternatively, a plurality of concentric ovals sharing the same center as the oval expressed by the expression (4) with the ratio between the major and minor axes thereof being fixed may be formed and then the above correction may be effected on each pixel on the concentric oval. With this alternative method too, the appropriate correction of the entire original image is possible.

With the above, appropriate correction or compensation of peripheral light-off becomes possible even when this peripheral light-off occurs in the form of concentric oval contours due to e.g. curving of the film.

Figure 11:
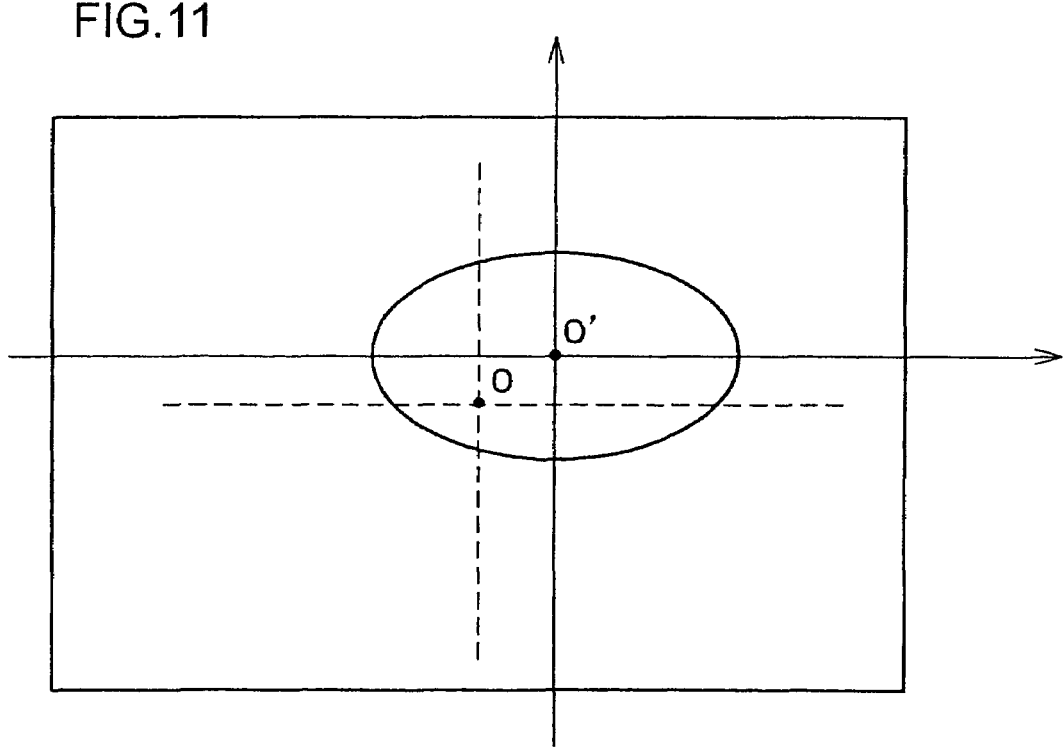
FIG. 11 is an explanatory view showing a group of pixels located along an oval whose center is offset from the center of an original image.

Incidentally, due to certain causes such as a particular shape of the lens employed, condition of the film at the time of photography and/or construction of the shutter mechanism employed, as shown in FIG. 11, it sometimes happens that the center O' of the concentric oval is offset from the center O of the original image. In such case, the above-described correction of peripheral light-off may be effected by not using the center of the original image as the origin, but by shifting the origin to the center O' of the concentric oval. Such origin shift can be readily possible by the well-known coordinate transformation operation.

Figure 12:
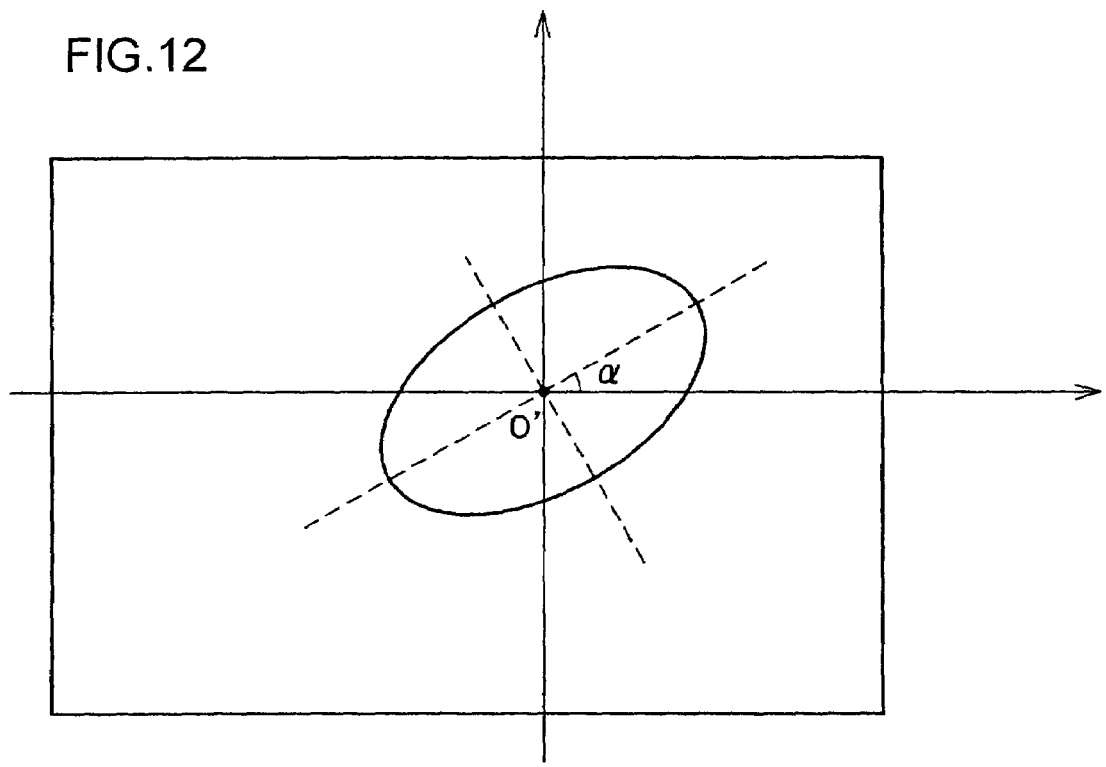
FIG. 12 is an explanatory view showing a group of pixels located along an oval which is offset from and is also inclined relative to the original image.
Figure 13:
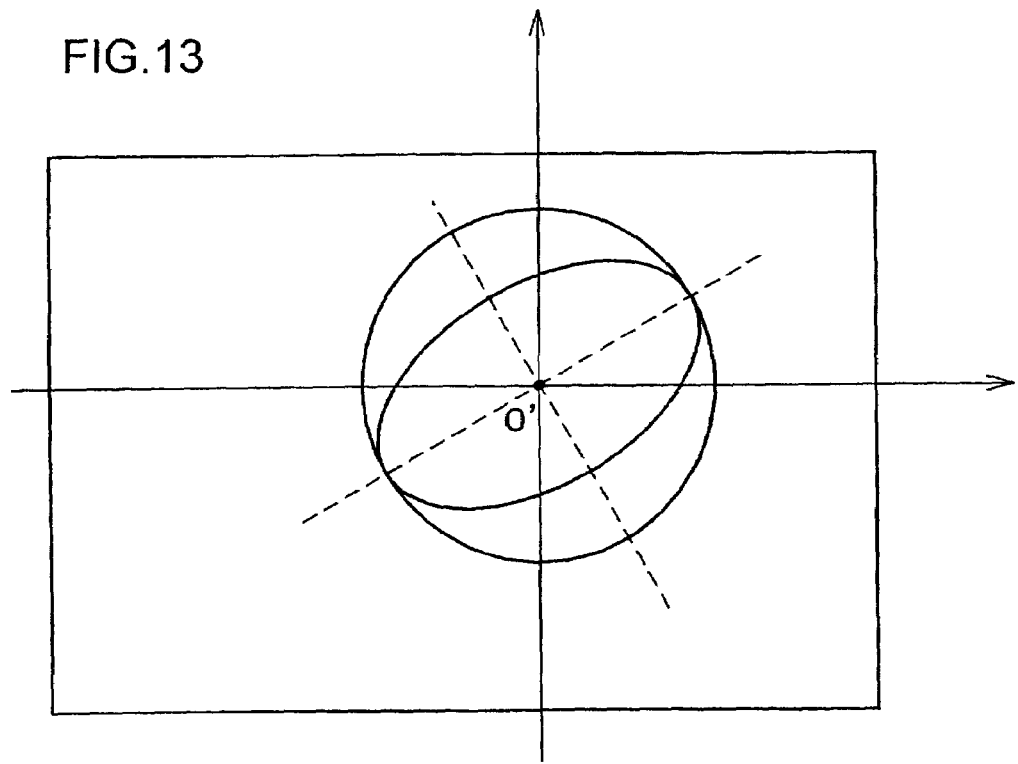
FIG. 13 is an explanatory view showing a group of pixels located along a true circle in the case of absence of e.g. the curving of the film, the pixels having a same amount of peripheral light reduction as a corresponding group of pixels located along the oval.

Moreover, due the same causes noted above, as shown in FIG. 12, it may sometimes happen also that the concentric oval has an inclination of α about the origin O'. In this case too, as shown in FIG. 13, the method utilizes the radius of the true circle representing a same amount of light reduction in the case of absence of such causes as the curving of the film.

Namely, as described hereinbefore, a value of one: r is calculated and then θ is derived from the expression (2). Then, as shown in the foregoing expression (1), for each pixel on this inclined oval, its pixel value is multiplied by a same correction coefficient: $(1(\cos θ)^4)$. With this, the pixel value of each pixel on the oval can be corrected appropriately. In this case too, the correction is possible also by effecting the coordinate transformation operation in advance.

Figure 14:
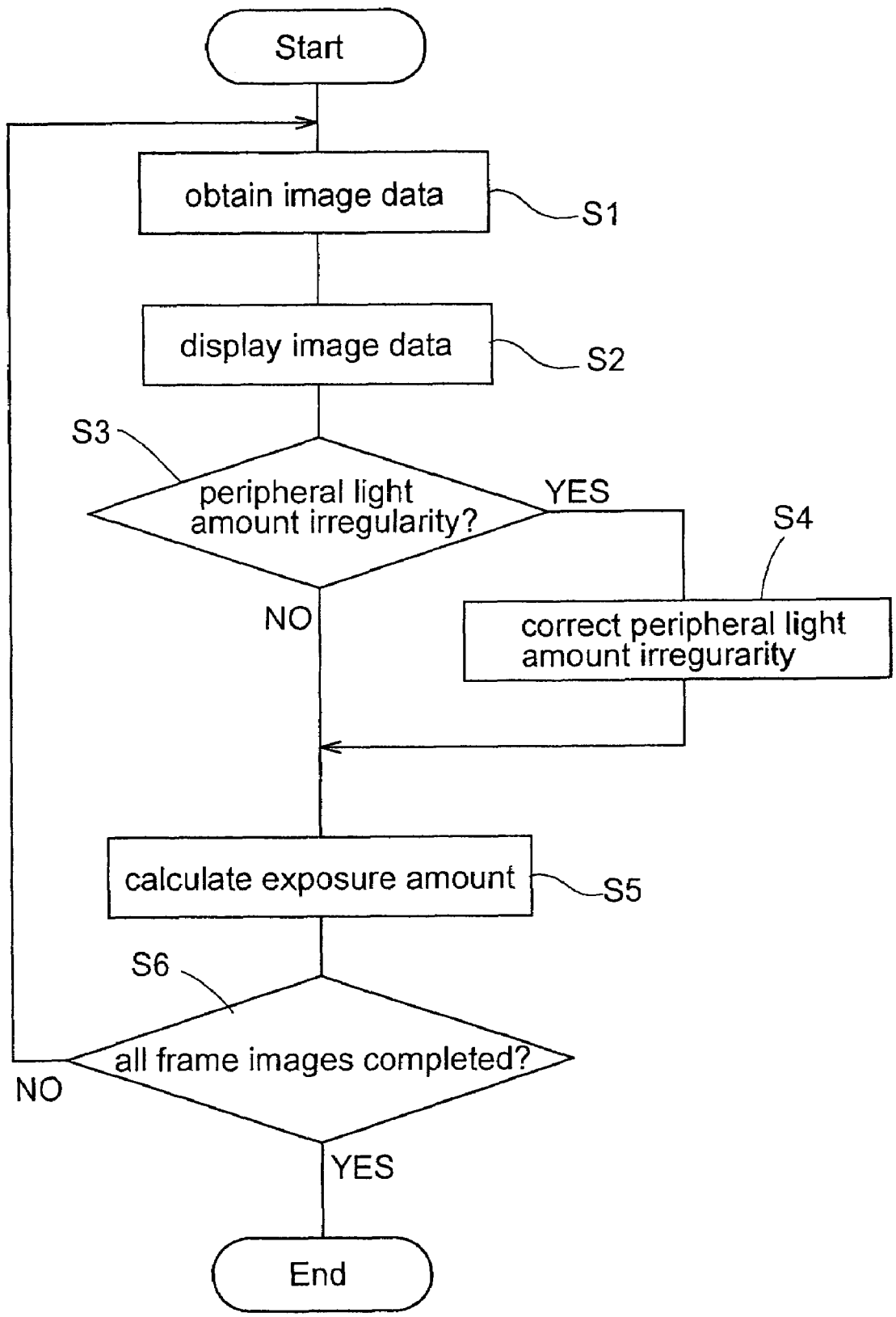
FIG. 14 is a flowchart illustrating flow of a process carried out by the image outputting system relating to one embodiment of the invention.

Next, the flow of the process carried out by the image outputting system shown in FIG. 1 will be described with reference to the flowchart of FIG. 14.

First, an original image recorded on a photographic film is read by the film scanner 1 for obtaining image data of this original image (step 1, referred to as S1 hereinafter).

Upon obtaining the image data of the original image by the film scanner 1, this image data is inputted to the image processor 2 via the data input section 6. Then, an image based on this image data obtained from the original image is displayed on the display unit 4 (S2).

Next, an operator checks this image displayed on the display unit 4 and determines whether peripheral light-off effect is present in this image or not. If it is determined that the original image has light amount irregularity (YES at S3), then, this determination is transmitted from the input unit 5 to the image processor 2, so that a peripheral light-off correction is effected at the correction processing section 7.

The peripheral light-off correction in this embodiment is carried out as follows. First, while the original image is being displayed on the display unit 4, the operator will appropriately set, via the input unit 5, the center of oval, the coefficient h and the coefficient v of the oval expression, the inclination a of the oval and the coefficient a of the expression (2). Then, based on these set values, the correction operation based on the expression (1) is carried out and the resultant corrected image is displayed on the display unit 4. Then, the operator will check this corrected image and depending on its corrected condition, the operator will appropriately change, if needed, any of the center of oval, the coefficient h and the coefficient v of the oval expression, the inclination a of the oval and the coefficient a, thereby to provide the optimum correction condition.

If the result of the determination at S3 is NO, that is, if it is determined that the original image bears no peripheral light-off effect, and also after the peripheral light-off correction has been carried out at S4, then, the exposure amount calculating section 8 effects calculation of an exposure amount (S5). In this, after effecting such process as gamma correction based on the image data to be outputted, a calculation is carried out for obtaining exposure amount data to be outputted to the photographic printer 3. Then, this calculated exposure amount data is outputted via the data output section 9 to the photographic printer 3.

Then, at S6, it is determined whether the process has been completed for al of the frame images to be processed or not. If not, the process is repeated from S1. The photographic printer 3 carries out printing and developing operations on the print paper based on the exposure amount data inputted thereto, and outputs their photographic prints.

Incidentally, in the above-described process, the setting of the center of oval, the coefficient h and the coefficient v of the oval expression, the inclination a of the oval and the coefficient a of the expression (2) is carried out by the operator while this operator checks and observes the corrected condition of the image. The invention is not limited thereto. Instead, the exposure amount may be automatically set by a process described next.

As described hereinbefore, the peripheral light-off phenomenon occurs at the time of photography due to e.g. the aberration of the lens of the camera used. In this regard, since disposable cameras in general do not allow adjustment of aperture or zooming, all images obtained by a same type of disposable camera will have substantially same type and degree of the peripheral light-off phenomenon effect. That is, all images photographed by one particular type of disposable camera will have substantially identical peripheral light-off effect.

Based on this, a peripheral light-off condition may be obtained in advance for each type of disposable cameras and the center of oval, a set of values of the coefficient h and the coefficient v of the oval expression, the inclination a of the oval and the coefficient a of the expression (2) may be stored for each camera type. Then, when image data is actually inputted to the image processor 2, the processor may recognize which type of disposable camera was used for obtaining this image data and then read out a set of values of the center of the oval, the coefficient h and the coefficient v of the oval expression, the inclination a of the oval and the coefficient a of the expression (2) for that particular type, so that the correction processing section 7 may carry out the process according to these values. With this method, there is no necessity for the operator to appropriate set the center of the oval, the coefficient h and the coefficient v of the oval expression, the inclination a of the oval and the coefficient a of the expression (2) while observing the condition of the corrected image. Hence, the operator's trouble may be eliminated and at the same time the entire process may be carried out speedily.

The method for recognizing which type of disposable camera was used for obtaining the image data inputted to the image processor 2 may vary in many ways. According to one exemplary method, when the film is set to the film scanner 1, the operator determines which type of disposable camera was used for the photography of this film. Then, the operator may input this information via the input unit 5 to the image processor 2. In the case of this method, for instance, at S4 in the flowchart shown in FIG. 1, the operator may effects selection or determination of the type of the disposable camera employed, instead of effecting the setting of the center of the oval, the coefficient h and the coefficient v of the oval expression, the inclination a of the oval and the coefficient a of the expression (2).

According to another method, the film scanner 1 may be equipped with a mechanism for detecting the type of film, so that the information concerning the film type will be transmitted to the image processor 2. In general, there exists one-to-one correspondence relationship between the film type and the type of disposable camera. Hence, the image processor 2 may determine the type of the disposable camera based on the film type information received and then set the center of the oval, the coefficient h and the coefficient v of the oval expression, the inclination a of the oval and the coefficient a of the expression (2) in accordance with the determined camera type. This method can entirely eliminate input operation by the operator for correction. Thus, the method enables the peripheral light-off correction process to be carried out automatically, thus achieving significant improvement in the processing capacity.

As such mechanism adapted for detection of film type, it is conceivable to provide a mechanism configured to detect the film type by e.g. reading magnetic data recorded in an APS (Advanced Photo System) film. Most of the disposable cameras commercially available at present employ such APS film which is accommodated in a small film cartridge. Although recording of magnetic information is not done for each film frame with disposable cameras, information including the film type information is recorded in advance at the beginning of the film roll. Therefore, by reading this information, detection of film type is possible.

Further, it is also conceivable to detect density of the "ground" or substrate of the film and determine the film type based on the detected density. This is possible because the density of the film substrate differs according to each single type of the film. Then, by detecting the density of film substrate by means of a CCD, the type of the film can be specified. In the case of this construction, if scanning means for reading image data of a frame image is adapted for detecting also the density of the substrate of the film, the film type detection is made possible without adding any special construction to the film scanner 1.

Further, in the foregoing embodiment, a photographic film was described as an example of the image source. Instead, the technique of the present invention may be applied also to any other type of image source such as a semiconductor memory storing photographic image data obtained by a digital camera.

In the foregoing embodiment, the center of the oval, the coefficient h and the coefficient v of the oval expression, the inclination a of the oval and the coefficient a of the expression (2) are all set as parameters. The invention is not limited thereto however. For instance, for simplifying the construction, the construction may be modified not to take the inclination a into consideration, so that this modified construction sets only the center of the oval, the coefficient h and the coefficient v of the oval expression, and the coefficient a of the expression (2). Alternatively, the construction may be modified not to take the center of the oval into consideration, so that this modified construction sets only the coefficient h and the coefficient v of the oval expression, the inclination a of the oval and the coefficient a of the expression (2). The construction may be modified also not to take the slope $\alpha$ of the oval as well as the center of the oval, so that this construction sets only coefficient h and the coefficient v of the oval expression and the coefficient a.

Incidentally, the procedure described in the foregoing embodiment can be realized in the form of a computer program. And, this computer program will be stored in a computer-readable storage medium. In the case of the present invention, this storage medium can be an unillustrated memory (e.g. ROM per se) required for the process executed at the image processor 2. Or, though not shown, it can be a program recording medium to be inserted into a program reader device as an external storage unit so that its program may be loaded into the device upon the insertion.

In any of the cases above, it is possible to adapt the stored program to be executable when accessed by a microprocessor (not shown). Or, it is also possible to adapt the program to be executed when this program is read from the medium and then this read program is downloaded to an unillustrated program storing area of the microprocessor. In this case, a program required for the downloading operation will be stored in advance in the main body of the device.

In the above, the program medium described above refers to a recording medium detachable to a main device body and this medium can fixedly storing the program therein, such as the tape type media as a magnetic tape or cassette tape, a disc type media such as magnetic discs including a floppy (registered trademark) disc, a hard disc, etc, as well as optical discs including CD-ROM, MO, MD, DVD, etc, the card type media such as IC card (including a memory card) or an optical card, or the semiconductor memory devices including a mask ROM, EPROM, EEPROM, flash ROM, etc.

Lastly, the present invention is not limited by the above-described embodiments, but can be subjected to various changes or modifications within the scope of the invention defined in the appended claims.

What is claimed is:

1. An image correction processing method for correcting a pixel value of each pixel constituting image data obtained from an original image affected by the peripheral light-off, the method comprising the computer-implemented steps of:
   (1) converting a distance between each pixel of a group of pixels which have an equal amount of peripheral light amount reduction and which are located on a common contour line of an oval about a predetermined reference pixel located at the center thereof and said predetermined reference pixel into a radius of a true circle having a diameter corresponding to the major axis of said oval;
   (2) for each pixel, obtaining an angle value thereof in proportion to said radius obtained at said converting step and then obtaining a $\cos^4$ value of said angle value; and
   (3) multiplying an inverse of said $\cos^4$ value obtained for each pixel by a pixel value of this pixel, thereby to obtain a corrected pixel value for said pixel.

2. The method according to claim 1, wherein said oval has a predetermined inclination relative to the original image.

3. The method according to claim 1, wherein a proportional coefficient used in the calculation of the angle value in proportion to the radius is determined according to each particular condition of the peripheral light amount reduction present in the original image.

4. The method according to claim 1, wherein a proportional coefficient used in the calculation of the angle value in proportion to the radius is determined according to each type of the camera used for obtaining the original image.

5. An image correction processing apparatus for correcting a pixel value of each pixel constituting image data obtained from an original image affected by the peripheral light-off, the apparatus method comprising:
   (1) a pixel coordinate transforming unit for converting a distance between each pixel of a group of pixels which have an equal amount of peripheral light amount reduction and which are located on a common contour line of an oval about a predetermined reference pixel located at the center thereof and said predetermined reference pixel into a radius of a true circle having a diameter corresponding to the major axis of said oval;
   (2) a $\cos^4$ calculating unit for obtaining, for each pixel, an angle value thereof in proportion to said radius obtained by said conversion and then obtaining a $\cos^4$ value of said angle value; and
   (3) a correction calculating unit for multiplying an inverse of said cos4 value obtained for each pixel by a pixel value of this pixel, thereby to obtain a corrected pixel value for said pixel.

6. The apparatus according to claim 5, further comprising a coefficient look-up table storing therein a plurality of proportional coefficients for use in the calculation of the angle value in proportion to the radius to be readable for a plurality of types of photographic cameras, respectively.

7. A computer-readable medium having stored therein computer-executable instructions which when executed performs an image processing method, the method comprising:
   (1) converting a distance between each pixel of a group of pixels which have an equal amount of peripheral light amount reduction and which are located on a common contour line of an oval about a predetermined reference pixel located at the center thereof and said predetermined reference pixel into a radius of a true circle having a diameter corresponding to the major axis of said oval;
   (2) for each pixel, obtaining an angle value thereof in proportion to said radius obtained at said converting step and then obtaining a $\cos^4$ value of said angle value; and
   (3) multiplying an inverse of said $\cos^4$ value obtained for each pixel by a pixel value of this pixel, thereby to obtain a corrected pixel value for said pixel.

* * * * *